United States Patent Office 2,753,339
Patented July 3, 1956

2,753,339

MANUFACTURE OF LOW VISCOSITY ETHYL CELLULOSE PHTHALATE

Carl J. Malm and Carlton L. Crane, Rochester, N. Y., assignors to Eastman Kodak Company, Rochester, N. Y., a corporation of New Jersey No Drawing. Application December 11, 1952, Serial No. 325,442

7 Claims. (Cl. 260—226)

This invention relates to a process for preparing low viscosity dicarboxylic acid esters of ethyl cellulose in which the viscosity of the ethyl cellulose is adjusted to the desired degree immediately prior to its esterification.

The making of dicarboxylic acid esters of ethyl cellulose is taught in U. S. Patent No. 2,093,462 of Malm and Waring. In the processes described in that patent, however, the product obtained may vary somewhat in viscosity from that which is desired and, therefore, that method cannot be depended upon where a selected viscosity ethyl cellulose phthalate is to be prepared. In the method of U. S. application Serial No. 272,697, filed February 20, 1952, of Hiatt, Mench and Emerson, the dicarboxylic acid ester of ethyl cellulose is prepared without any appreciable change of the cuprammonium viscosity of the ethyl cellulose taking part in the reaction. Therefore, in using this method the viscosity of the final product depends upon a variation in the viscosity of the ethyl cellulose initially employed as the starting material. Ordinarily, however, ethyl cellulose is available in only one or a limited number of viscosities and therefore, this method does not allow the preparation of ethyl cellulose phthalates of varied viscosities. Thus if an ethyl cellulose phthalate of low viscosity is desired it is necessary in that method to start with an ethyl cellulose of a specific lower viscosity in order to get an ester of the low viscosity desired.

One object of our invention is to provide a method of preparing low viscosity dicarboxylic acid esters of ethyl cellulose of a selected viscosity. Another object of our invention is to make possible as the starting material in the manufacture of ethyl cellulose dicarboxylic acid esters of varying low viscosities ethyl celluloses of one viscosity. A further object of our invention is to provide a method for making low viscosity dicarboxylic acid esters of ethyl cellulose in which the viscosity of the ethyl cellulose used as the starting material is broken down to the desired degree immediately prior to the esterification reaction. Other objects of our invention will appear herein.

We have found that the viscosity of ethyl cellulose may be uniformly reduced by treating the same when dissolved in acetic acid with a mineral acid such as sulfuric acid and that the resulting mass may then be immediately converted to esterification conditions whereby a selected viscosity dicarboxylic acid ester of the ethyl cellulose is obtained. We have found that by our method of making dicarboxylic acid esters of ethyl cellulose products of 1 to 20 c. p. s. viscosity (3% solution in 70% ethyl alcohol, 20% isopropyl alcohol and 10% butyl alcohol at 25° C.) may be obtained which viscosity is determined by the amount and intensity of the treatment of the ethyl cellulose with mineral acid prior to its esterification. In those cases where water is present in the ethyl cellulose-acetic acid-sulfuric acid system the speed at which the viscosity of the ethyl cellulose at a definite temperature is lowered is influenced thereby. We have found that any fluctuations in the rate of lowering the viscosity of the ethyl cellulose due to the water content in such a system can be overcome if part or all of the dicarboxylic acid anhydride which is to be used in the esterification reaction is also included in the solution of ethyl cellulose in acetic acid and sulfuric acid in which the viscosity lowering occurs. We have found that the preferred procedure in accordance with our invention involves first dissolving the ethyl cellulose in acetic acid, adding thereto dicarboxylic acid anhydride and sulfuric acid and allowing the mass to stand until the ethyl cellulose viscosity is lowered to the desired degree followed by adding sodium acetate, or a like acid soluble salt which exhibits basic properties in an aliphatic acid solution, to the mass and carrying out the esterification as described in Hiatt et al. application Serial No. 272,697.

In the step of lowering the viscosity of 100 parts of ethyl cellulose, the amount of sulfuric acid employed may be within the range of .1–10 parts. However, commercial ethyl cellulose ordinarily has an appreciable salt content therein which salt content adversely affects the rate of lowering the viscosity of the ethyl cellulose particularly if but a small quantity of sulfuric acid is employed. Therefore in most cases it is desirable in the viscosity lowering step to use at least 0.5% of sulfuric acid based on the weight of the ethyl cellulose and when amounts of sulfuric acid of at least 0.5% are used it is desirable to use a temperature of 100° F. or less such as down to 70° F. for better control of the viscosity reduction of the ethyl cellulose.

As the starting material for making dicarboxylic acid esters of ethyl cellulose in accordance with our invention, any ethyl cellulose may be employed and ordinarily the use of one of the commercially available cellulose ethers is satisfactory. Obviously in view of the nature of the invention the ethyl cellulose should have a viscosity higher than that which will be necessary in preparing ethyl cellulose esters of low viscosity. If the preparation of a dicarboxylic acid ester of ethyl cellulose having a viscosity of 1–10 c. p. s. is desired it would be desirable to use an ethyl cellulose having a viscosity of at least 150 seconds, when the viscosity is determined as described in Example 1, although this may vary depending on the viscosity desired in the final product. In the viscosity lowering of the ethyl cellulose the amount of phthalic anhydride to employ in the preferred procedure will depend upon the water which is present in the system. The amount of water present should be no more than 10% of the total liquid which is employed and it is preferred that the amount of water be less than 1% to give the best control. However, regardless of whether the water content is in the lower or the upper part of the permissible range it is more convenient to employ all of the dicarboxylic acid anhydride in the viscosity lowering step and after the desired viscosity lowering has occurred sodium acetate or a like salt can then be added to promote the esterification. The extent to which the viscosity of the ethyl cellulose is lowered in that step is determined by the testing of samples thereof at convenient intervals.

Although our invention relates to the preparation of low viscosity dicarboxylic acid esters of ethyl cellulose generally, our process is particularly adapted to the preparation of the phthalate esters thereof. However, other anhydrides than phthalic such as tetrahydrophthalic, succinic, maleic, nitrophthalic or the like may be employed for preparing the corresponding ester. In the esterification procedure some of the catalysts which are useful are sodium acetate, potassium acetate, calcium acetate, magnesium acetate, pyridine acetate and the like. The amount of catalyst employed is preferably 10–20% based on the weight of the ethyl cellulose however this proportion may be varied from 5 to 150% and will promote the esterification. The amount of dicarboxylic anhydride employed should be such that it will supply phthalyl or other dicarboxylic acid groups to all of the hydroxyl groups available in the ethyl cellulose employed as the starting material.

The following examples illustrate various preparations of dicarboxylic acid esters of ethyl cellulose in accordance with our invention.

*Example 1*

100 parts of dry ethyl cellulose having an ethoxyl content of 45% was dissolved in 150 parts of acetic acid. There is then added to this solution 1 part of sulfuric acid and 75 parts of phthalic anhydride. The viscosity of this solution was determined by diluting a sample thereof with an equal weight of acetic acid and measuring the time required for an 1/8" steel ball to drop 10 cm. at 25° C. therethrough in a 1/2" diameter test tube. The viscosity of the solution was 700 sec. The ethyl cellulose-acetic acid-sulfuric acid-phthalic anhydride system was heated to 100° F. and samples were removed hourly and tested for viscosity. The viscosities were found to be as follows:

| Hours | Seconds |
|---|---|
| 1 | 150 |
| 2 | 52 |
| 3 | 21 |
| 4 | 10 |

Several batches of ethyl cellulose phthalate were made from ethyl cellulose solutions of different viscosities prepared as above which esterification was carried out by adding 10 parts of sodium acetate to the solution and heating for 7 hours at 170° F., thereby obtaining a product containing approximately 14% phthalyl. The original viscosity in each case and the viscosities of the resulting ethyl cellulose phthalates are given below. The viscosities of the ethyl cellulose phthalates were those of a 3% solution thereof in a mixture of 70% ethyl alcohol, 20% isopropyl alcohol and 10% butyl alcohol at 25° C.

| Viscosities of the Ethyl Cellulose Solutions, sec. | Viscosities of the Ethyl Cellulose Phthalates Prepared Therefrom, cps. |
|---|---|
| 700 | 18 |
| 115 | 7.4 |
| 32 | 5.1 |
| 15 | 4.2 |
| 10 | 3.6 |

*Example 2*

Sixty parts of a commercial grade of ethyl cellulose containing 0.6% moisture (ethoxyl—46.5%, viscosity at 5% concentration in toluene-ethyl alcohol 80:20% at 25° C.—107 cps.) were placed in a jacketed sigma blade type mixer together with 90 parts of acetic acid. The mass was stirred at 96° F. until a clear solution was obtained. A mixture consisting of 0.319 part of 94% sulfuric acid and 1 part of acetic acid was added to the mixer and the reaction was stirred at 96° F. for 1¼ hours. The viscosity of the acetic acid solution as determined in Example 1 was 150 seconds.

Six parts of anhydrous sodium acetate together with 43.5 parts of phthalic anhydride were added to the mixer and the temperature of the mass was raised slowly to 157° F.

After 8 hours the solution was diluted with 200 parts of glacial acetic acid and precipitated in distilled water. The precipitate was washed in 130° F. distilled water until it was essentially free of acid and dried. The product analyzed as follows:

| | Percent |
|---|---|
| Apparent phthalyl | 12.6 |
| Free phthalic acid | 0.0 |

Viscosity at 3% concentration in ethyl alcohol-isopropanol-n-butanol 70:20:10%—9.3 cps.

We claim:

1. The process for preparing low viscosity dicarboxylic acid esters of ethyl cellulose which comprises treating ethyl cellulose in solution in acetic acid with .1–10 parts of sulfuric acid per 100 parts of ethyl cellulose and subsequently adding to the mass an acid soluble acetate salt which exhibits basic properties in non-aqueous aliphatic acid solution in an amount of 5–150 parts which will promote esterification with a dicarboxylic acid anhydride and esterifying the ethyl cellulose with a dicarboxylic acid anhydride, the salt added acting as a catalyst for the esterification reaction.

2. The process of preparing low viscosity ethyl cellulose phthalates which comprises treating ethyl cellulose in solution in acetic acid with .1–10 parts of sulfuric acid per 100 parts of ethyl cellulose, subsequently adding to the mass an acid soluble acetate salt which exhibits basic properties in non-aqueous aliphatic acid solution in an amount of 5–150 parts which will promote esterification with a dicarboxylic acid anhydride and phthalating the ethyl cellulose with phthalic anhydride, the salt added acting as a catalyst to promote the phthalation.

3. The method of preparing low viscosity dicarboxylic acid esters of ethyl cellulose which comprises treating ethyl cellulose in solution in acetic acid with .1–10 parts of sulfuric acid per 100 parts of ethyl cellulose, subsequently adding sodium acetate to the mass in an amount of 5–150 parts which will promote esterification with a dicarboxylic acid anhydride and esterifying the ethyl cellulose with a dicarboxylic acid anhydride, the sodium acetate acting as a catalyst to promote the esterification reaction.

4. A process of preparing low viscosity ethyl cellulose phthalates which comprises treating ethyl cellulose in solution in acetic acid with .1–10 parts of sulfuric acid per 100 parts of ethyl cellulose to which mass has been added phthalic anhydride subsequently adding to the mass sodium acetate in an amount of 5–150 parts which will promote esterification with a dicarboxylic acid anhydride and phthalating the ethyl cellulose with phthalic anhydride, the sodium acetate acting as a catalyst to promote the phthalation reaction.

5. The process of preparing low viscosity ethyl cellulose phthalate which comprises treating ethyl cellulose in solution in acetic acid with .1–10 parts of sulfuric acid per 100 parts of ethyl cellulose subsequently adding to the mass 10–20 parts of sodium acetate and esterifying the ethyl cellulose with phthalic anhydride, the sodium acetate acting as a catalyst to promote the phthalation reaction.

6. The process of preparing low viscosity ethyl cellulose phthalate which comprises dissolving 100 parts of ethyl cellulose in 150 parts of acetic acid, adding thereto one part of sulfuric acid and 75 parts of phthalic anhydride, subsequently adding to the mass 10–20 parts of sodium acetate and phthalating the ethyl cellulose, the sodium acetate acting as a catalyst to promote the phthalation reaction.

7. The process of preparing a low viscosity ethyl cellulose phthalate which comprises dissolving 60 parts of ethyl cellulose in 90 parts of acetic acid, adding to the mass a mixture of .319 part of 94% sulfuric acid and 1 part of acetic acid and heating the mass at 96° F. for 1¼ hours, then adding to the mass six parts of sodium acetate and 43.5 parts of phthalic anhydride and phthalating the ethyl cellulose therein, the sodium acetate acting as a catalyst to promote the phthalation reaction.

References Cited in the file of this patent

UNITED STATES PATENTS

| 1,936,976 | Becker | Nov. 28, 1933 |
| 2,069,974 | Schulze | Feb. 9, 1937 |
| 2,352,261 | Hiatt et al. | June 27, 1944 |